(12) United States Patent
Taniuchi et al.

(10) Patent No.: US 12,388,122 B2
(45) Date of Patent: Aug. 12, 2025

(54) SOLID-STATE BATTERY MODULE

(71) Applicant: HONDA MOTOR CO., LTD., Tokyo (JP)

(72) Inventors: Takuya Taniuchi, Saitama (JP); Masahiro Ohta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/481,242

(22) Filed: Oct. 5, 2023

(65) Prior Publication Data

US 2024/0063449 A1 Feb. 22, 2024

Related U.S. Application Data

(62) Division of application No. 16/982,034, filed as application No. PCT/JP2019/007695 on Feb. 27, 2019, now abandoned.

(30) Foreign Application Priority Data

Mar. 28, 2018 (JP) .................. 2018-061753

(51) Int. Cl.
| | |
|---|---|
| *H01M 10/00* | (2006.01) |
| *H01M 10/0562* | (2010.01) |
| *H01M 10/48* | (2006.01) |
| *H01M 50/224* | (2021.01) |
| *H01M 50/531* | (2021.01) |
| *H01M 50/103* | (2021.01) |
| *H01M 50/209* | (2021.01) |
| *H01M 50/296* | (2021.01) |

(52) U.S. Cl.
CPC ..... *H01M 10/482* (2013.01); *H01M 10/0562* (2013.01); *H01M 10/48* (2013.01); *H01M 10/486* (2013.01); *H01M 50/224* (2021.01); *H01M 50/531* (2021.01); *H01M 50/103* (2021.01); *H01M 50/209* (2021.01); *H01M 50/296* (2021.01)

(58) Field of Classification Search
CPC .. H01M 50/20; H01M 10/482; H01M 10/486; H01M 50/209; H01M 50/531; H01M 2220/20; H01M 10/425; H01M 2200/10; H01M 2220/30; H01M 10/6561; H01M 50/548; H01M 50/55; H01M 10/0562; H01M 10/613; H01M 10/615; H01M 10/6557; H01M 10/6567; H01M 50/224; Y02P 70/50; Y02E 60/10
See application file for complete search history.

(56) References Cited

U.S. PATENT DOCUMENTS

| | | | |
|---|---|---|---|
| 2010/0047685 A1* | 2/2010 | Lee | H01M 50/566 429/176 |
| 2011/0250485 A1* | 10/2011 | Tsukuda | H01M 10/0481 429/153 |

(Continued)

*Primary Examiner* — Nicholas P D'Aniello
(74) *Attorney, Agent, or Firm* — CKC & Partners Co., LLC (57) ABSTRACT

Provided is a battery module having a high energy density and exhibiting suppressed electrode displacement or peeling during vibration. In the present invention, a residual space in a battery cell, which is necessary for the lithium ion secondary batteries employing the liquid electrolyte is eliminated, and additionally a module component is disposed in a portion that would provide the residual space.

8 Claims, 6 Drawing Sheets

(56) References Cited

U.S. PATENT DOCUMENTS

2013/0216880 A1\* 8/2013 Park .................... H01M 50/105
 429/94
2018/0212210 A1\* 7/2018 Suzuki ................. H01M 50/119

\* cited by examiner

SOLID-STATE BATTERY MODULE

CROSS-REFERENCE TO RELATED APPLICATION

This application is a Divisional Application of the U.S. application Ser. No. 16/982,034, filed on Sep. 17, 2020, which is a 371 application of PCT/JP2019/007695, filed on Feb. 27, 2019, and based on and claims the benefit of priority from Japanese Patent Application No. 2018-061753, filed on 28 Mar. 2018, the content of which is incorporated herein by reference.

TECHNICAL FIELD

The present invention relates to a solid-state battery module.

Furthermore, the present invention relates to a battery module having a high energy density, ensuring sufficient surface pressure, and exhibiting suppressed electrode displacement during vibration.

BACKGROUND ART

Conventionally, lithium ion secondary batteries are widely used as secondary batteries with high energy density.

Such a lithium ion secondary battery includes a structure in which a separator is disposed between a positive electrode and a negative electrode, and the space between the positive electrode and the negative electrode is filled with a liquid electrolyte (electrolyte solution).

Since the electrolyte solution of the secondary lithium-ion battery is usually a flammable organic solvent, the safety to heat, in particular, becomes a problem in some cases. Therefore, a solid-state battery employing an inorganic solid electrolyte instead of the organic liquid electrolyte has been proposed (see Patent Document 1)

Solid-state batteries employing the solid electrolyte eliminates the problem arising from heat, and additionally allows for an increase in capacity and/or voltage by stacking, and further can meet the demand for compactness, as compared with the batteries employing the electrolyte solution.

Examples of the shape of such a secondary battery include a cylindrical shape, a rectangular shape, and the like. Then, a secondary battery module is constructed when the secondary battery is used for devices requiring a large current and a large voltage, e.g. motor drives for hybrid electric vehicles, and the like.

The secondary battery module includes a plurality of secondary batteries connected in series, and includes a battery case which includes a space for accommodating the plurality of secondary batteries and electrode connection portions, and a module component coupled to the battery case (see Patent Document 2).

Figure 1A:
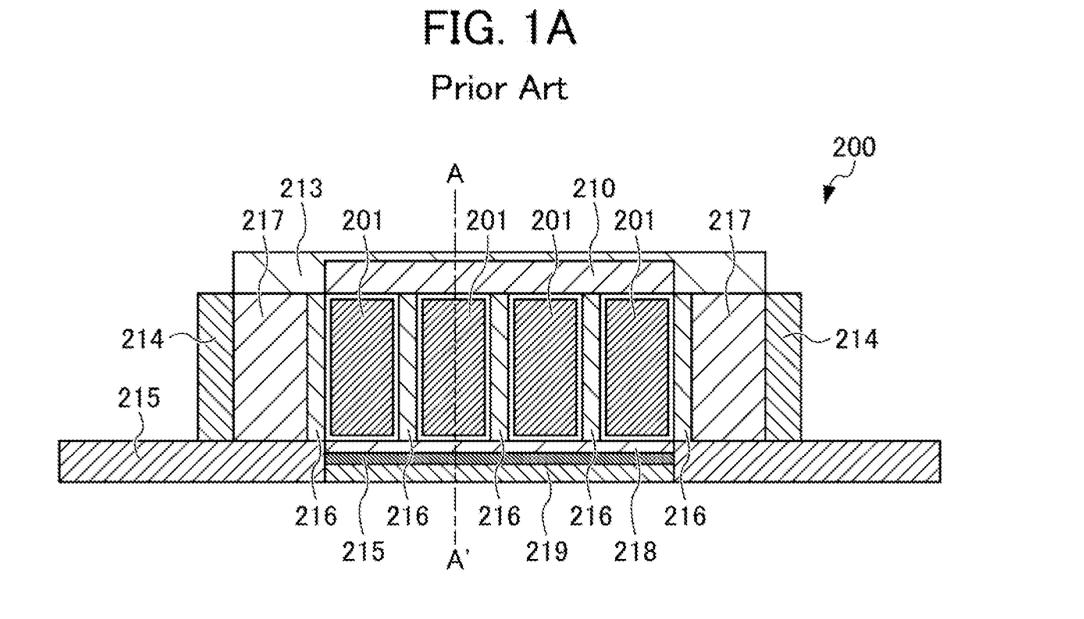
FIGS. 1A and 1B are a side view and a sectional view taken along the line A-A' of a conventional secondary battery module, respectively.
Figure 1B:
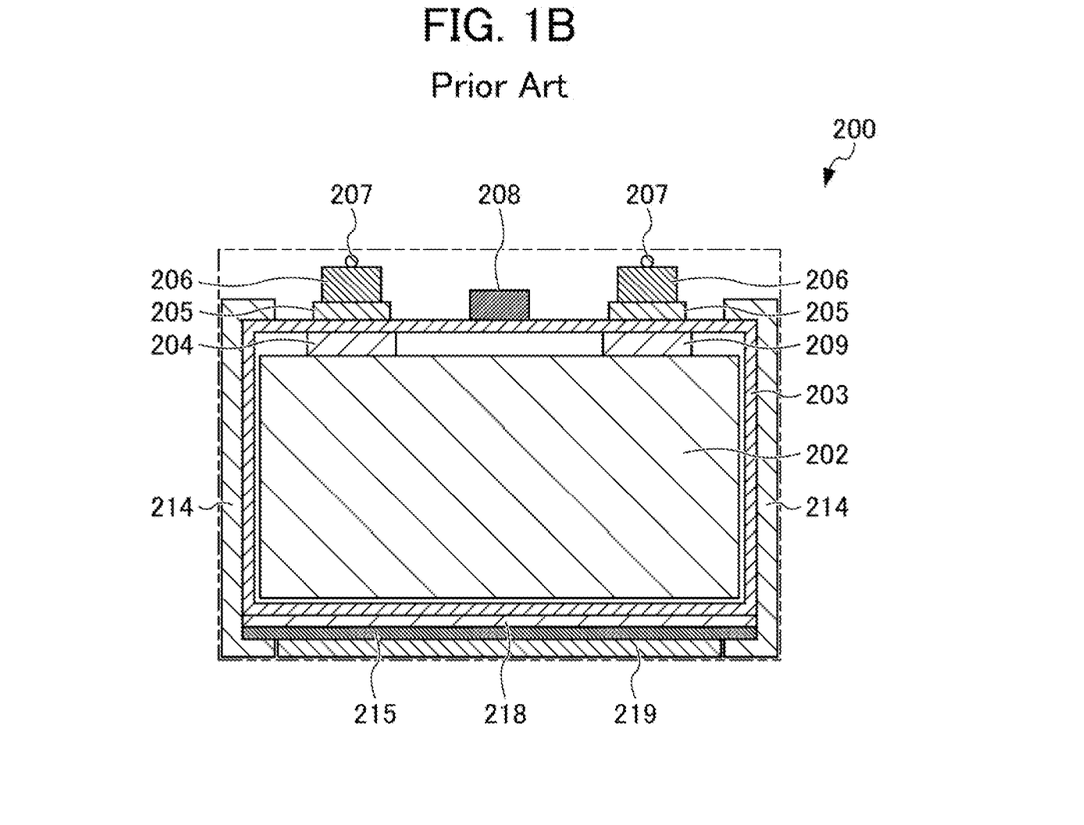

A more specific secondary battery module has, for example, a configuration in which a battery cell 202 and a separator 216 are alternately stacked and the stack is fixed using end plates 217 and binding bars 214 provided at both ends of the stack, as shown in FIG. 1A, which is a cross-sectional view of the battery module 200 taken along the stacking direction of the battery, and in FIG. 1B, which is a sectional view of the battery module 200 taken along the line A-A'.

However, as shown in FIG. 1B, the battery 201 constituting the conventional secondary battery module includes a space between a battery case 203 and a battery cell 202 for the purpose of storing a gas which may be generated in the case of a liquid electrolyte or of introducing the electrolyte solution.

This residual space reduces the energy density of the cell.

Furthermore, in the conventional battery module, the module components (in FIG. 1B, terminals 205, bus bars 206, voltage detection lines 207, a thermistor 208, binding bars 214, a lower plate 215, a thermally conductive material 218, and cooling water 219) are arranged outside the battery case 203 with the module components being superposed on the electrode connection portion.

Therefore, the volume of the entire battery module (i.e., the region indicated by a broken line) is large, leading to a reduction of the energy density of the module.

Further, in some cases, electrode displacement or the like occurs due to vibration or the like.

Patent Document 1: Japanese Unexamined Patent Application, Publication No. 2000-106154
Patent Document 2: Japanese Unexamined Patent Application, Publication No. 2006-278327

DISCLOSURE OF THE INVENTION

Problems to be Solved by the Invention

The present invention has been made in view of the above background art, and an object thereof is to provide a battery module having a high energy density and exhibiting suppressed electrode displacement during vibration.

Means for Solving the Problems

The present inventors have focused on the facts that in the solid-state battery including a solid electrolyte, the amount of a gas generated during charging and discharging is extremely small, unlike the lithium ion secondary battery employing a liquid electrolyte, and also that swelling of the battery due to the introduction of the electrolyte is unlikely. Then, the present inventors have found that a solid-state battery module having a high energy density and exhibiting suppressed displacement or peeling or the like of the battery cell during vibration can be achieved by eliminating the residual space in the battery cell, which is necessary for the lithium ion secondary batteries employing a liquid electrolyte, and additionally arranging the module components in the portion that would provide the residual space, to thereby complete the present invention.

Specifically, a first aspect of the present invention relates to a solid-state battery module including a plurality of solid-state batteries and a module component, in which the plurality of solid-state batteries are arranged so as to be substantially parallel to a predetermined direction, each of the plurality of solid-state batteries includes a solid-state battery cell, and a battery case for accommodating the solid-state battery cell, in which the solid-state battery cell includes a positive electrode, a negative electrode, a solid electrolyte present between the positive electrode and the negative electrode, a positive electrode tab connected to the positive electrode, and a negative electrode tab connected to the negative electrode, in which the outer dimension of the battery case is substantially identical to the outer dimension of the solid-state battery cell, and in which the battery case has a recess, and the module component is disposed in the recess.

The module component may be at least one selected from the group consisting of a bus bar, a thermistor, a harness, a voltage detection line, a battery case fixing member, a cell voltage and temperature monitoring unit and the like.

The battery case may have at least one convex portion, and the positive electrode tab and the negative electrode tab may be stored in the convex portion.

The battery case may have at least two convex portions, and the positive electrode tab and the negative electrode tab may be each stored in a different convex portion.

The convex portion for storing the positive electrode tab and the convex portion for storing the negative electrode tab may be provided on the same face in the battery case.

The convex portion for storing the positive electrode tab and the convex portion for storing the negative electrode tab may be provided on different faces in the battery case.

The battery case may be made of metal, the face constituting the battery case which is substantially parallel to the predetermined direction may have a pressing portion for applying a surface pressure to the solid-state battery cell, and a gap may be defined between two adjacent solid-state batteries of the plurality of solid-state batteries by the pressing portion.

The pressing portion may be provided only on one face of the battery case.

The pressing portion may be provided on a set of opposing faces of the battery case.

At least one selected from the group consisting of air, water, a heat transfer material, a heater and the like for controlling the cell temperature, and an electrically insulating material or an electrically conductive material for making the module function, a cushioning material and a battery case fixing member and the like may be present in the gap.

A heat sink may be disposed in the pressing portion.

The heat sink may be a fin or an uneven structure.

The solid-state battery may include an expansion material between the solid-state battery cell and the battery case, and the expansion material may expand in volume by water absorption or a chemical reaction, or change in volume by heat.

Another aspect of the present invention relates to an apparatus including the solid-state battery module described above.

Effects of the Invention

The solid-state battery module according to the aspect of the present invention has a high energy density, and exhibits suppressed electrode displacement during vibration.

PREFERRED MODE FOR CARRYING OUT THE INVENTION

Hereinafter, embodiments of the present invention will be described with reference to the accompanying drawings.

However, the embodiments described below merely illustrate the present invention, and the present invention is not limited to the following.

<Solid-State Battery Module>

The solid-state battery module according to an embodiment of the present invention is characterized in that the solid-state battery module includes a plurality of solid-state batteries and a module component, in which the plurality of solid-state batteries are arranged so as to be substantially parallel to a predetermined direction, each of the plurality of the solid-state batteries includes a solid-state battery cell, and a battery case for accommodating the solid-state battery cell, in which the solid-state battery cell includes a positive electrode, a negative electrode, a solid electrolyte present between the positive electrode and the negative electrode, a positive electrode tab connected to the positive electrode, and a negative electrode tab connected to the negative electrode, in which the inner dimension of the battery case is substantially identical to the outer dimension of the solid-state battery cell, and in which the battery case has a recess, and the module component is disposed in the recess. Hereinafter, each component will be described with reference to the drawings.

[Battery Module of Conventional Structure]

First, a description will be given of a battery module of a conventional structure.

FIGS. 1A and 1B are each a diagram showing a battery module of a conventional structure.

FIG. 1A is a cross-sectional view of a battery module 200 taken along the stacking direction of the battery 201, and FIG. 1B is a cross-sectional view of the battery module 200 taken along the line A-A'.

In the conventional battery module 200, a plurality of batteries 201 are arranged so as to be substantially parallel to a predetermined direction, as shown in FIG. 1A.

A separator 216 is disposed between the adjacent batteries 201 so that the separator 216 provides electrical isolation and applies an even pressure to the batteries 201 constituting the module.

End plates 217 and binding bars 214 are disposed at both ends of the stack of the batteries 201 and the separators 216.

The end plates 217 apply a surface pressure to the stack of the plurality of batteries 201 and the plurality of separators 216 to maintain their alignment, and the binding bars 214 enhance their binding.

As shown in FIG. 1A, the upper face of the conventional battery module 200 is covered with a top cover 213 corresponding to a lid of the module, and the electrical insulation is maintained by the top cover 213.

In addition, the stack of the batteries 201 and the separators 216 is fixed to a lower plate 215 by the binding bar 214, to maintain the shape of the stack.

Further, a thermally conductive material 218 such as a silicon compound and cooling water 219 are disposed on the bottom face of the battery module 200 (i.e., the surface on which the lower plate 215 resides) for the purpose of conducting heat from the stack of the batteries 201 and cooling the stack.

Further, in the conventional battery module 200, the battery 201 includes a battery cell 202 and a battery case 203 for accommodating the battery cell 202, as shown in FIG. 1B, which is a cross-sectional view taken along the line A-A' in FIG. 1A.

Furthermore, the conventional battery cell 202 has a positive electrode (not shown), a negative electrode (not shown), an electrolyte (not shown) present between the positive electrode and the negative electrode, a positive electrode tab 204 connected to the positive electrode, and a negative electrode tab 209 connected to the negative electrode. Then, a space is provided between the battery case 203 and the battery cell 202 for the purpose of storing a gas generated in the case of a liquid electrolyte and/or for the purpose of introducing the electrolyte solution.

In other words, in the conventional battery 201, there is a difference in outer dimension between the battery cell 202 and the battery case 203, and the battery case 203 has a residual space in which no battery cell 202 resides.

This residual space reduces the energy density of the battery cell.

In addition, in the conventional battery module 200, a terminal 205, a bus bar 206, a voltage detection line 207, and a thermistor 208, which each correspond to the module component 210, are disposed outside the battery case 203, with the module components being superposed on the positive electrode tab 204 and the negative electrode tab 209, as shown in FIGS. 1A and 1B.

Then, the battery module 200 is covered by the top cover 213 so as to store the superposed module components 210.

Therefore, in the conventional battery module 200, the volume of the entire battery module 200 (i.e., the region indicated by the broken line) is larger than the volume of the battery case 203 which provides the outer shape of the battery 201, resulting in a low energy density of the module.

Further, in some cases, electrode displacement or the like occurs in the conventional battery module 200 due to vibration or the like.

Solid-State Battery Module According to Embodiment of the Present Invention

In contrast, the solid-state battery module according to the embodiment of the present invention is characterized by including an extremely small residual space in the solid-state battery constituting the module and arranging the module component in a portion that would be the residual space.

Specifically, the solid-state battery module according to the embodiment of the present invention includes a plurality of solid-state batteries and a module component, in which the plurality of solid-state batteries are arranged so as to be substantially parallel to a predetermined direction, each of the plurality of solid-state batteries includes a solid-state battery cell, and a battery case for accommodating the solid-state battery cell, in which the solid-state battery cell includes a positive electrode, a negative electrode, a solid electrolyte present between the positive electrode and the negative electrode, a positive electrode tab connected to the positive electrode, and a negative electrode tab connected to the negative electrode, in which the inner dimension of the battery case is substantially identical to the outer dimension of the solid-state battery cell, and in which the battery case has a recess, and the module component is disposed in the recess.

Figure 2A:
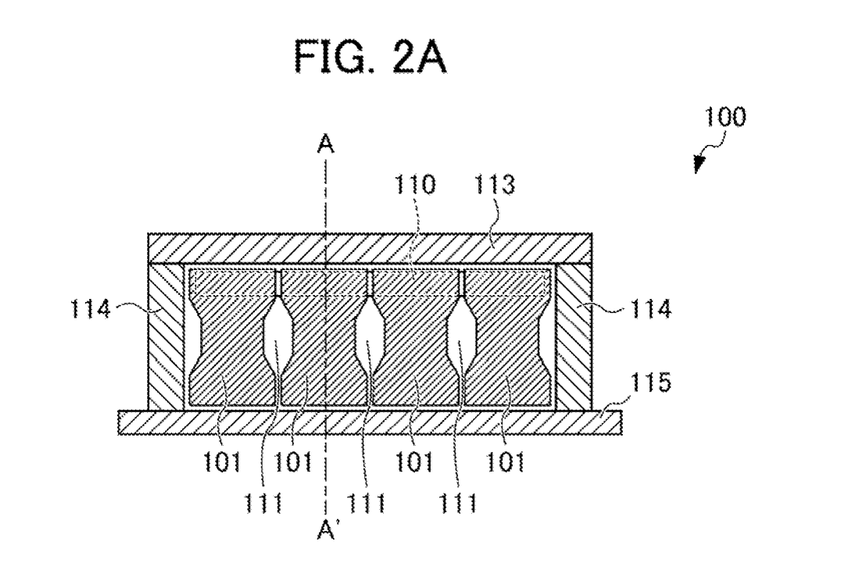
FIGS. 2A and 2B are a side view and a sectional view taken along the line A-A' of a solid-state cell module according to an embodiment of the present invention, respectively.
Figure 2B:
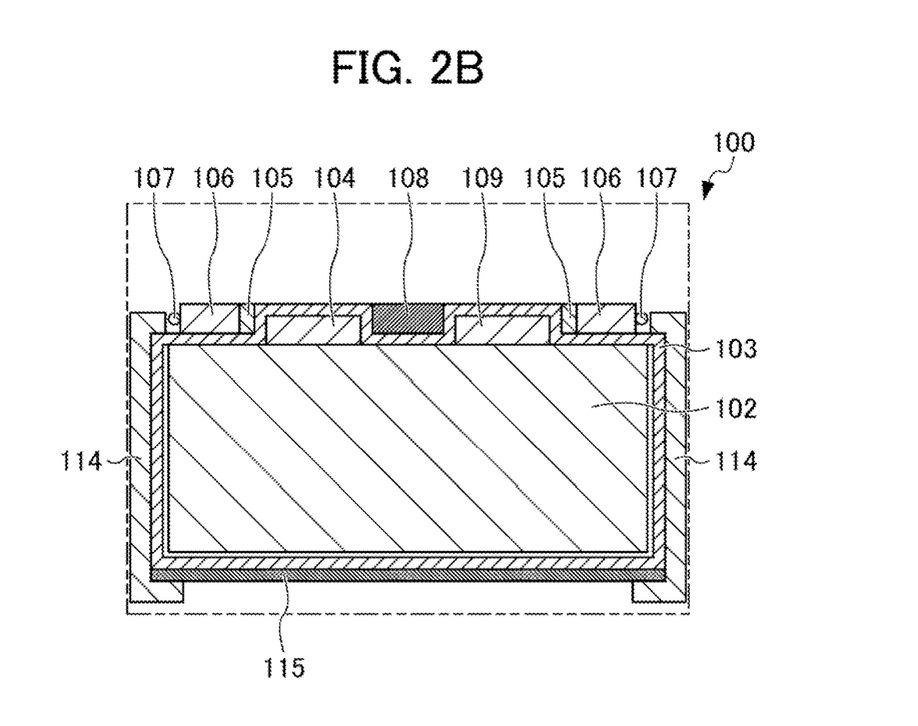

FIGS. 2A and 2B are each a diagram showing an embodiment of the solid-state battery module of the present invention. FIG. 2A is a cross-sectional view of the battery module 100 taken along the stacking direction of the plurality of batteries 101 (i.e., a direction perpendicular to the predetermined direction), and FIG. 2B is a cross-sectional view of the battery module 100 taken along the line A-A'. The battery module 100 according to the embodiment of the present invention shown in FIGS. 2A and 2B includes a plurality of solid-state batteries shown in FIG. 3A.

In the battery module 100, which is an embodiment of the solid-state battery module of the present invention, the plurality of batteries 101 are arranged so as to be substantially parallel to the predetermined direction, as shown in FIG. 2A.

In the case of the battery module 100, which is an embodiment of the present invention, no separator is disposed between the adjacent batteries 101, but separators may be disposed as required in the present invention.

In the battery module 100, which is an embodiment of the present invention, only the binding bars 114 are disposed at both ends of the stack of the batteries 101 to enhance binding of the stack.

Note that in the case of the battery module 100, which is an embodiment of the present invention, an end plate is not disposed at either end of the plurality of batteries 101. However, in the case where the application of a surface pressure to the stack of the batteries 101 is necessary, an end plate may be disposed as required.

As shown in FIG. 2A, the upper face of the battery module 100, which is an embodiment of the present invention, is covered with a top cover 113 corresponding to the lid of the module, and the electrical insulation is maintained by the top cover 113.

The stack of the batteries 101 is also secured to the lower plate 115 by a binding bar 214 to maintain its shape.

In the case of the battery module 100, which is an embodiment of the present invention, a thermally conductive material such as a silicon compound or cooling water is not disposed on the bottom face of the battery module 100 (i.e., the surface on which the lower plate 115 resides). However, in the case where dissipation of heat from the stack of the batteries 101 and cooling thereof are necessary, the heat conductive material or cooling water may be disposed as required.

(Arrangement Direction of Solid-State Battery (Predetermined Direction))

In the solid-state battery module according to the embodiment of the present invention, the plurality of solid-state batteries are arranged so as to be substantially parallel to the predetermined direction.

The arrangement direction of the solid-state batteries is not particularly limited in the embodiment of the present invention.

For example, in the solid-state battery module according to the embodiment of the present invention shown in FIG. 2, the arrangement direction of the solid-state batteries (defined herein as a "predetermined direction") aligns with a direction substantially perpendicular to the top cover 113 and the lower plate 115.

However, in the present invention, the arrangement direction is not limited to this direction.

The solid-state batteries may be stacked so as to be substantially parallel to the top cover 113 and the lower plate 115.

When the solid-state batteries are arranged substantially parallel to the top cover 113 and the lower plate 115, a module having a large footprint can be achieved, and thus an improvement of the energy density of the module can be achieved along with an improvement of an electrode filling rate.

Next, the features of the solid-state battery module according to the embodiment of the present invention will be described with reference to FIG. 2B.

In the battery module 100, which is an embodiment of the present invention, the battery 101 includes a battery cell 102 and a battery case 103 for accommodating the battery cell 102, as shown in FIG. 2B, which is a cross-sectional view taken along the line A-A' in FIG. 2A.

Then, the battery cell 102, which is an embodiment of the present invention, has, like the conventional battery cell, a positive electrode (not shown), a negative electrode (not shown), a solid electrolyte (not shown) present between the positive electrode and the negative electrode, a positive electrode tab 104 connected to the positive electrode, and a negative electrode tab 109 connected to the negative electrode.

Here, the present invention is characterized in that a space corresponding to the residual space in the battery is extremely small.

In other words, in the conventional battery, there is a difference in outer dimension between the battery cell and the battery case, and the battery case has a residual space in which no battery cell resides. However, in the battery constituting the battery module according to the embodiment of the present invention, the outer dimension of the battery case is substantially identical to the outer dimension of the solid-state battery cell, and such a residual space as in the conventional battery is not formed purposefully.

More specifically, the battery case covers the battery cell along the outer shape of the battery cell, and the portion corresponding to the conventional residual space is present as a recess.

This makes it possible to improve the energy density in each battery, and to improve the degree of freedom in design of the battery shape.

Referring to the battery module 100, which is an embodiment of the present invention, the outer shape of the battery case 103 conforms to the outer shape of the battery cell 102, and there is no residual space between the positive electrode tab 104 and the negative electrode tab 109 inside the battery case 103, as shown in FIG. 2B.

A recess is formed between the positive electrode tab 104 and the negative electrode tab 109. That is, on the upper face of the battery cell 102, there is a recess in the region corresponding to the residual space in the conventional battery.

The present invention is further characterized by arranging the module component(s) in the portion that would provide a residual space in the conventional battery. More specifically, in the conventional battery module, the module components such as the terminal, the bus bar, the voltage detection line, and the thermistor are arranged outside of the battery case having the residual space, with the module components being superposed on the positive electrode tab and the negative electrode tab. However, in the battery module according to the embodiment of the present invention, the module components are arranged in the recess in the battery constituting the module, the recess being formed in the region corresponding to the residual space in the conventional battery.

This makes it possible to reduce the volume of the entire battery module, and consequently to improve the energy density of the battery module.

Further, electrode displacement or the like due to vibration or the like can be suppressed.

Referring to the battery module 100, which is an embodiment of the present invention, the terminals 105 constituting the module component 110 are arranged in the recess of the battery case 103, with the terminals 105 being electrically connected to the positive electrode tab 104 and the negative electrode tab 109, as shown in FIG. 2B.

Further, other module components 110, i.e., the bus bar 106, the voltage detection line 107, and the thermistor 108 are arranged in the recess of the battery case 103, so as to line up with the terminals 105.

<Solid-State Battery>

The solid-state battery includes the solid-state battery cell and the battery case for accommodating the solid-state battery cell.

As shown in FIG. 2B, which is a cross-sectional view taken along the line A-A' in FIG. 2A, the battery 101 according to the embodiment of the present invention includes the battery cell 102 and the battery case 103 for accommodating the battery cell 102.

[Solid-State Battery Cell]

The solid-state battery cell, like the conventional battery cell, includes the positive electrode, the negative electrode, the solid electrolyte present between the positive electrode and the negative electrode, the positive electrode tab connected to the positive electrode, and the negative electrode tab connected to the negative electrode.

The solid-state battery cell in the embodiment of the present invention can function whether it is a stack of electrodes or a laminated cell.

The battery cell 102 shown in FIG. 2B, which is an embodiment of the present invention, has a positive electrode layer (not shown), a negative electrode layer (not shown), a solid electrolyte layer (not shown) present between the positive and negative electrode layers, a positive electrode tab 104 connected to the positive electrode layer, and a negative electrode tab 109 connected to the negative electrode layer.

(Positive Electrode and Negative Electrode)

The positive and negative electrodes constituting the solid-state battery of the solid-state battery module according to the embodiment of the present invention are not particularly limited, as long as they are usable as a positive electrode or a negative electrode of the solid-state battery.

The positive electrode and the negative electrode each include an active material and a solid electrolyte, and may optionally include a conductivity aid, a binder, and the like.

The positive and negative electrodes constituting the solid-state battery of the solid-state battery module according to the embodiment of the present invention may be prepared by selecting two types of materials from the materials capable of constituting an electrode, comparing the charge and discharge potentials of the two types of compounds, and assigning one exhibiting a higher potential to the positive electrode, and the other exhibiting a lower potential to the negative electrode, and this process allows any battery to be configured.

(Solid Electrolyte)

The solid electrolyte constituting the solid-state battery of the solid-state battery module according to the embodiment of the present invention includes a binder and the like, as needed.

In the embodiment of the present invention, the material of the solid electrolyte is not particularly limited as long as it is usable as a solid electrolyte of a solid-state battery. For example, the solid electrolyte is exemplified by an oxidebased solid electrolyte and a sulfide-based solid electrolyte. Note that the composition ratio of each substance contained in the solid electrolyte is not particularly limited as long as the battery can be appropriately operated.

Further, the thickness, shape and the like of the solid electrolyte are not particularly limited, as long as the solid electrolyte can be appropriately present between the positive electrode and the negative electrode and ion conduction between the positive electrode and the negative electrode is possible.

Further, there is no particular limitation on the manufacturing method for the solid electrolyte.

(Positive Electrode Tab/Negative Electrode Tab)

The positive and negative electrode tabs are respectively connected to the current collecting foils of the positive electrode and the negative electrode, and serve as a current collector for the battery.

With regard to the positive and negative electrode tabs constituting the solid-state battery of the solid-state battery module according to the embodiment of the present invention, the material, structure, and the like thereof are not particularly limited, as long as the tabs are a current collector used in the solid-state battery.

In the embodiment of the present invention, the material for the positive and negative electrode tabs is exemplified by a metal foil having a thickness of about 10 to 500 μm, or the like.

{Tab Arrangement}

In the solid-state battery constituting the solid-state battery module according to the embodiment of the present invention, the positive electrode tab and the negative electrode tab are respectively connected to the current collecting foil of the positive electrode layer and the negative electrode layer. Thus, in the battery cell, the positive and negative electrode tabs are provided so as to extend from the end faces of the stack of the positive electrode layer, the solid electrolyte layer, and the negative electrode layer.

Here, the arrangement of the tabs will be described with reference to the drawings.

Figure 3A:
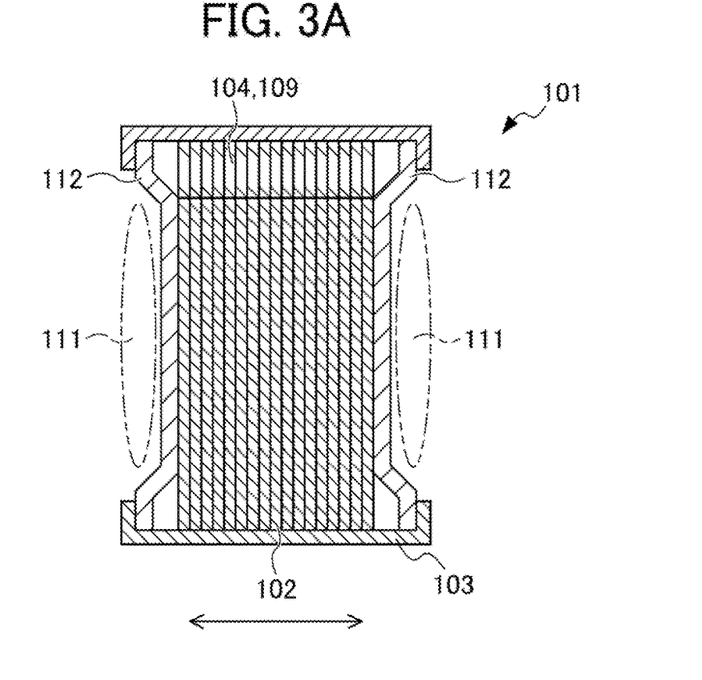
FIGS. 3A and 3B are cross-sectional views of embodiments of a solid-state battery constituting the solid-state battery module.
Figure 3B:
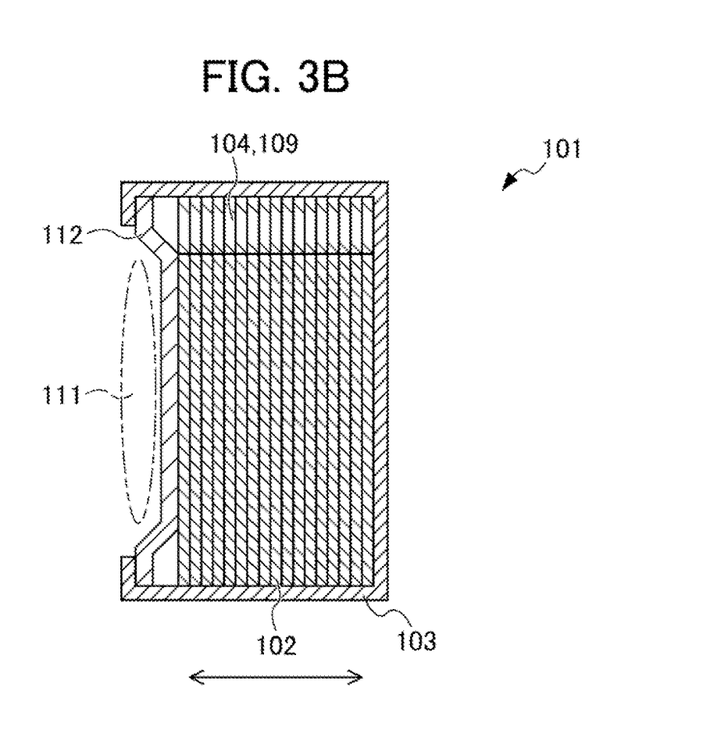

FIG. 2B is a cross-sectional view of the battery module 100 according to the embodiment of the solid-state battery module of the present invention taken along the line A-A', and FIGS. 3A and 3B are each a cross-sectional view of a solid-state battery according to an embodiment constituting the solid-state battery module of the present invention.

FIGS. 3A and 3B show cross-sections of the positive electrode tab 104 portion and the negative electrode tab 109 portion, respectively, taken along a direction parallel to the stacking direction (indicated by the left right arrow) of the stack of the positive electrode layer, the solid electrolyte layer, and the negative electrode layer, which constitute the battery cell 102, and FIG. 2B shows a cross-section taken along a direction perpendicular to the stacking direction.

As shown in FIGS. 3A and 3B, the positive electrode tab 104 and the negative electrode tab 109 are respectively provided in connection with the current collecting foils of the positive electrode and the negative electrode so as to extend from the end faces of the stack of the positive electrode layer, the solid electrolyte layer, and the negative electrode layer, which constitute the battery cell 102.

In the embodiment shown in FIG. 2B, the positive electrode tab 104 and the negative electrode tab 109 each extend from a different site at the same end face of the stack of the positive electrode layer, the solid electrolyte layer, and the negative electrode layer of the battery cell 102.

Then, in the embodiment shown in FIG. 2B, the battery case 103 is provided with two convex portions, one being for storing the positive electrode tab 104 and the other being for storing the negative electrode tab 109, and the positive electrode tab 104 and the negative electrode tab 109 are each stored in the convex portion therefor.

Figure 4:
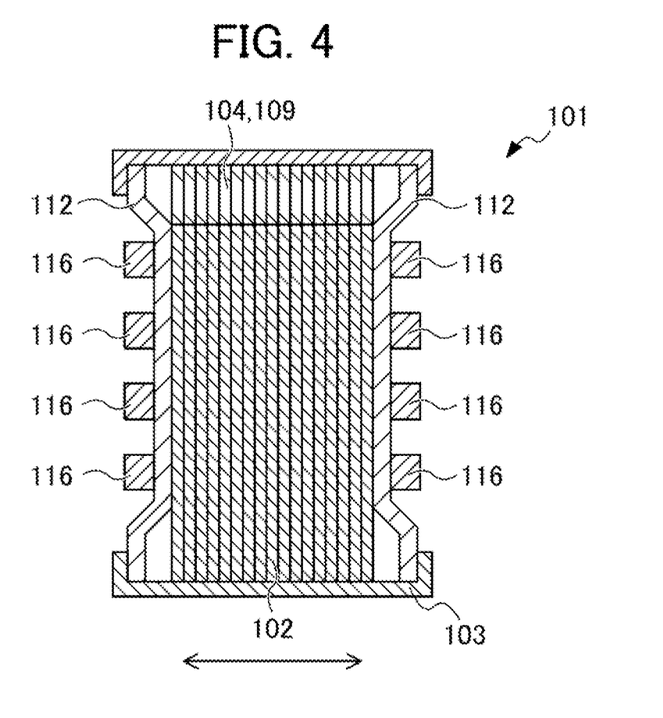
FIG. 4 is a cross-sectional view of an embodiment of a solid-state battery constituting the solid-state battery module.
Figure 5A:
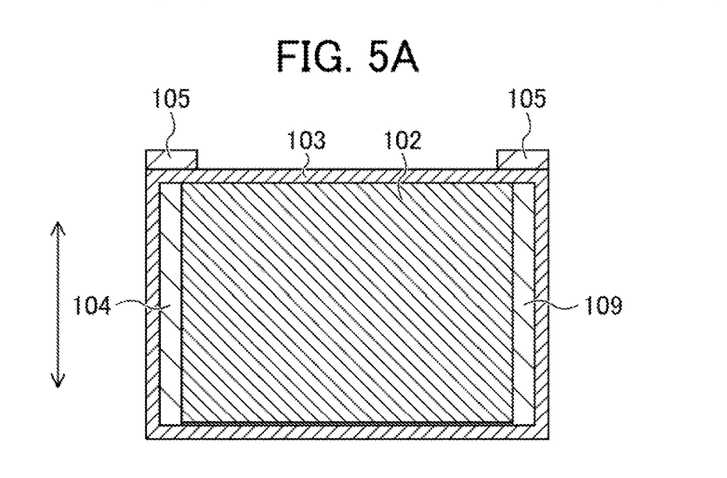
FIGS. 5A-5C are cross-sectional views of embodiments of a solid-state battery constituting the solid-state battery module.
Figure 5B:
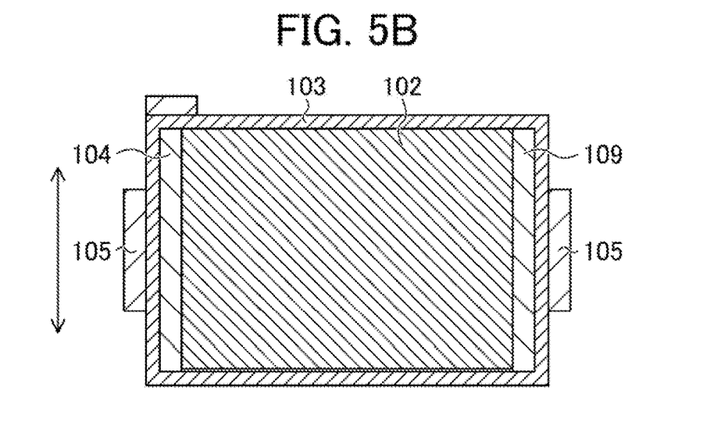
Figure 5C:
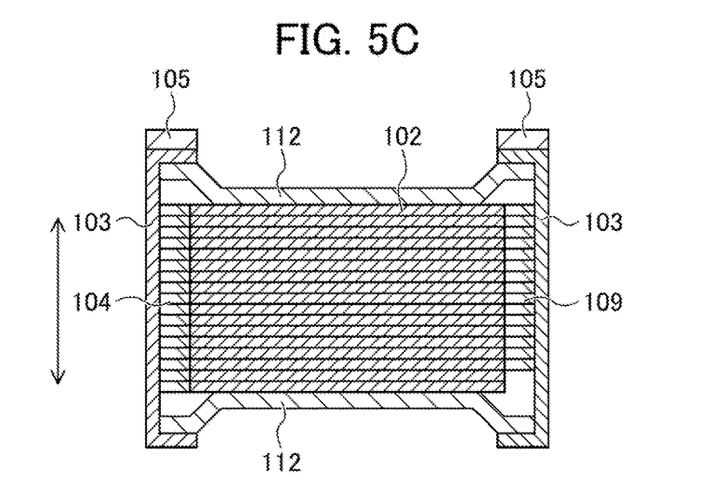

In the present invention, the positive electrode tabs 104 and the negative electrode tabs 109 may be arranged so as to extend from the same end face of the stack of the positive electrode layer, the solid electrolyte layer, and the negative electrode layer, which constitute the battery cell, as shown in FIGS. 2B, 3A to 3B, and 4, or may be separately arranged so that the positive electrode tabs 104 and the negative electrode tabs 109 each extend from a different end face, as shown in FIGS. 5A to 5C.

[Battery Case]

(Outer Dimension)

The outer dimension of the battery case of the solid-state battery constituting the solid-state battery module according to the embodiment of the present invention is substantially identical to the outer dimension of the solid-state battery cells.

This is because, unlike a lithium ion secondary battery into which a liquid electrolyte is introduced, the solid-state battery does not require a space for storing a gas or a space for introducing an electrolyte solution.

In other words, in the case of the solid-state battery, after inserting the battery cell into the battery case, the amount of the gas to be generated in the battery cell is negligibly small, and therefore the residual space is not required.

Thus, the battery case of the solid-state battery constituting the solid-state battery module according to the embodiment of the present invention has an extremely small space corresponding to the residual space, and covers the battery cell conforming to the outer shape of the battery cell. In the embodiment of the present invention, this makes it possible to reduce the volume of the solid-state battery, and consequently to improve the energy density of each battery and the degree of freedom in design of the battery shape.

In FIG. 2B, which is a cross-sectional view of the solid-state battery module according to an embodiment of the present invention, the battery cell 102 is accommodated in the battery case 103, the battery case 103 covers the battery cell 102 conforming to the outer shape of the battery cell 102, and the outer dimension of the battery case 103 is substantially identical to the outer dimension of the battery cell 102.

(Recess)

As described above, since the battery case of the solid-state battery constituting the solid-state battery module according to the embodiment of the present invention covers the battery cell conforming to the outer shape of the battery cell, and its outer dimension is substantially identical to the outer dimension of the solid-state battery cell, the portion corresponding to the residual space in the conventional battery portion will be present as a recess in the battery case.

In other words, since the recess in the embodiment of the present invention is a space which corresponds to the residual space in the conventional battery, the position where the recess is formed is not particularly limited in the battery case.

In any face of the battery case, the recess may be formed in a central portion of the face or in a peripheral portion thereof. Further, not only one recess, but also more than one recess may be provided in the battery case.

In the solid-state battery module according to the embodiment of the present invention, the module component is arranged in the recess of the battery case.

This makes it possible to reduce the volume of the entire battery module, and consequently to improve the energy density of the battery module.

Furthermore, since there is no residual space in the battery case, the displacement or peeling of the battery cell due to vibration or the like can also be suppressed.

In FIG. 2B, which is a cross-sectional view of the solid-state battery module according to the embodiment of the present invention, the thermistor 108, which is a module component, is disposed in the recess formed in the battery case 103.

(Materials)

The material of the battery case is not particularly limited, but is preferably a metal.

When the material is a metal, the heat dissipation may be improved, and the sealability of the battery case may be improved because of an improvement of the strength of the case itself as well as the weldability thereof.

(Pressing Portion)

In the case of a lithium ion secondary battery including a liquid electrolyte, inserting a battery cell into a battery case, followed by introducing an electrolyte solution causes the battery cell to swell with the electrolyte solution. Further, by performing the initial charging and discharging, followed by aging, the battery cell expands in volume. As a result, the battery case and the battery cell are in close contact, and surface pressure is generated therebetween.

However, with regard to the solid-state battery including a solid electrolyte, since the volume expansion of the battery cell is small after inserting the battery cell into the battery case, a sufficient surface pressure to the battery according to the above method is not generated.

Thus, the battery case of the solid-state battery constituting the solid-state battery module according to the embodiment of the present invention preferably has a pressing portion for applying a surface pressure to the solid-state battery cell.

The pressing portion exerts the action of applying a surface pressure to the solid-state battery cell by force of a spring.

Therefore, the pressing portion is provided in a face substantially perpendicular to the stacking direction of the stack of the positive electrode layer, the solid electrolyte layer, and the negative electrode layer in the solid-state battery cell (i.e., a face substantially parallel to the positive electrode layer, the solid electrolyte layer, and the negative electrode layer).

This allows for an application of surface pressure in the stacking direction of the stack of the positive electrode layer, the solid electrolyte layer, and the negative electrode layer, and for the application of an initial load to a single battery cell, thereby improving the input-output characteristics and the vibration resistance.

Further, since the pressing portion is present on the face substantially parallel to the arrangement direction of the solid-state battery in the solid-state battery module of the present invention (the predetermined direction), surface pressure is applied to the entire module, which makes it possible to omit the separator between the adjacent batteries and to omit the end plates at both ends of the module.

As a result, the volume of the entire module can be reduced, leading to an improvement of the energy density of the battery module.

The pressing portion in the embodiment of the present invention may be provided only on one face of the battery case, or may be provided on a set of opposing faces.

When the pressing portion is provided only on one face of the battery case, surface pressure will be applied in the stacking direction only from one side of the stack of the positive electrode layer, the solid electrolyte layer, and the negative electrode layer in the battery cell.

In the case where the pressing portion is provided on a set of opposing faces, the stack of the positive electrode layer, the solid electrolyte layer, and the negative electrode layer in the battery cell can be sandwiched, and surface pressure can be applied in the stacking direction from both sides.

In the present invention, the pressing portion is preferably provided on the set of opposing faces.

FIGS. 3 and 4 are cross-sectional views of an embodiment of the solid-state battery constituting the solid-state battery module of the present invention.

In the battery cell 102 in the battery 101 of FIGS. 3 and 4, the pressing portion 112 is provided on the face substantially perpendicular to the stacking direction of the stack of the positive electrode layer, the solid electrolyte layer, and the negative electrode layer (shown by the left right arrow).

In the battery 101 of FIGS. 3A and 4, the pressing portions 112 are provided on a set of opposing faces.

In FIG. 3B, the pressing portion 112 is provided only on one face of the battery case 103.

The structure of the pressing portion is not particularly limited, as long as it exerts the effect of applying surface pressure to the solid-state battery cell.

The structure of the pressing portion is exemplified by a stepped shape, a wavy shape, a shape formed of a curved surface, and the like.

In the battery 101 according to the embodiments shown in FIGS. 3 and 4, the stepped pressing portion 112 is provided.

Further, the pressing portion may form, in the battery case, a continuous structure with the portion other than the pressing portion or a discontinuous structure therewith.

By adopting the discontinuous structure, other forces can be applied together with the force by the spring.

In the battery 101 according to the embodiments of FIGS. 3 and 4, the stepped pressing portion 112 is formed discontinuously with the battery case 103.

The structure in which the pressing portion is slidable inwardly as in the present embodiment allows for easy application of surface pressure to the battery cell, for example, when the battery cell is pressed from both ends during the formation of the solid-state battery module. Alternatively, when the internal pressure of the battery cell is increased, a stress can be released, leading to an improvement in safety.

(Gap)

In the case where the battery case of the solid-state battery has the pressing portion, a gap is defined between the adjacent solid-state batteries in the solid-state battery module of the present invention.

Specifically, in FIG. 2A, which is a side view of the solid-state battery module according to the embodiment of the present invention, the battery module 100 takes a configuration in which a plurality of the solid-state batteries shown in FIG. 3 are arranged.

As shown in FIG. 2A, in the battery module 100, the plurality of batteries 101 are arranged so as to be substantially parallel to the predetermined direction, and the gap 111 is defined between the adjacent batteries 101 by the pressing portion 112 present in the battery case 103 of the battery 101.

At least one selected from the group consisting of air, water, a heat transfer material, a heater and the like for controlling the cell temperature, an electrically insulating material or an electrically conductive material for making the module function, a cushioning material, a battery case fixing member and the like is preferably present in the gap defined. The gap defined thus can impart heat dissipation together with insulating properties.

{Heat Sink}

Further, it is preferable that the heat sink is disposed in the pressing portion of the battery case.

The heat sink increases the cooling area and allows for an increase in cooling efficiency, which also makes it possible to omit cooling means other than the heat sink, such as cooling water.

The configuration of the heat sink is not particularly limited, and its size is not particularly limited as long as it can be disposed in the gap.

In the case where the heat sink is disposed in the pressing portion, the heat sink is preferably a fin.

The fin is particularly preferred in terms of cooling efficiency because it can increase the surface area of the battery case.

Note that the material of the fin is not particularly limited as long as it has good thermal conductivity.

Also, the shape of the fin is not particularly limited.

FIG. 4 is an example showing an embodiment of the solid-state battery including the fin in the pressing portion.

As shown in FIG. 4, in the battery 101, the battery cell 102 is contained in the battery case 103 having a pressing portion 112, and a plurality of fins 116 are arranged in the pressing portion 112.

In the case where the heat sink is provided in the pressing portion, the heat sink may be an uneven structure formed by subjecting the battery case surface to embossing or the like.

In the case of the uneven structure formed by subjecting the battery case surface to embossing or the like, the uneven structure can impart the cooling effect while suppressing a decrease in volume energy density of the solid-state battery obtained.

When the heat sink is the uneven structure, the shape thereof is not particularly limited, but for example, the heat sink preferably has a wavy shape.

In the case of the wavy shape, it is possible to generate a spring pressure of high uniformity in the pressing portion. Examples of the wavy shape include triangular wave shapes, saw-wave shapes, rectangular wave shapes, sinus-wave shapes, and the like.

(Convex Portion)

The battery case of the solid-state battery constituting the solid-state battery module according to the embodiment of the present invention has at least one convex portion, and the positive electrode tab and the negative electrode tab are preferably stored in the convex portion(s).

As described above, in the battery case of the solid-state battery constituting the solid-state battery module according to the embodiment of the present invention, its outer dimension is substantially identical to the outer dimension of the solid-state battery cell, and the portion corresponding to the residual space in the conventional battery is present as the recess in the battery case.

Therefore, in the battery cell, the positive electrode tab and the negative electrode tab extending from the end face of the stack of the positive electrode layer, the solid electrolyte layer, and the negative electrode layer will be stored in a portion other than the recess of the battery case.

Thus, in the present invention, it is preferable to use a battery case having a convex portion for storing the positive electrode tab and the negative electrode tab extending from the end face of the stack serving as a battery cell, and to store the positive electrode tab and the negative electrode tab in the convex portion.

This makes it possible to define the boundary between the convex portion and the recess formed in the portion corresponding to the residual space in the conventional battery, and to more densely pack the module component disposed in the recess.

As a result, the volume of the entire solid-state battery module can be reduced, and the energy density can be improved.

Further, it is preferable that the battery case of the solid-state battery constituting the solid-state battery module according to the embodiment of the present invention has at least two convex portions, and that the positive electrode tab and the negative electrode tab are each stored in a different convex portion.

When the battery case of the solid-state battery constituting the solid-state battery module according to the embodiment of the present invention has at least two convex portions, the convex portion for storing the positive electrode tab, and the convex portion for storing the negative electrode tab may be provided on the same face in the battery case, or provided on different faces.

FIG. 2B, which is a cross-sectional view of the battery module 100 according to an embodiment of the solid-state battery module of the present invention taken along the line A-A', and FIGS. 3A, 3B and 4, which are each a cross-sectional view of the solid-state battery according to the embodiment constituting the solid-state battery module according to the embodiment of the present invention, show the battery case 103 having two convex portions, one being for storing the positive electrode tab 104 and the other being for storing the negative electrode tab 109, and show an embodiment in which the convex portion for storing the positive electrode tab 104 and the convex portion for storing the negative electrode tab 109 are provided on the same face in the battery case 103.

FIGS. 5A to 5C show yet another embodiment in which the convex portion for storing the positive electrode tab 104 and the convex portion for storing the negative electrode tab 109 are provided on different faces in the battery case 103.

[Expansion Material]

As described above, with regard to the solid-state battery including the solid electrolyte, since the volume expansion of the battery cell is negligibly small after inserting the battery cell into the battery case, surface pressure due to the volume expansion of the battery cell is not generated, unlike the lithium ion secondary battery including the liquid electrolyte.

Thus, the solid-state battery constituting the solid-state battery module according to the embodiment of the present invention is preferably provided with an expansion material between the solid-state battery cell and the battery case. After inserting the battery cell into the battery case, the battery case can be brought into close contact with the battery cell by the expansion material, to thereby apply surface pressure to the solid-state battery.

FIG. 6 is an example showing an embodiment of a solid-state battery including the expansion material between the solid-state battery cell and the battery case.

Figure 6A:
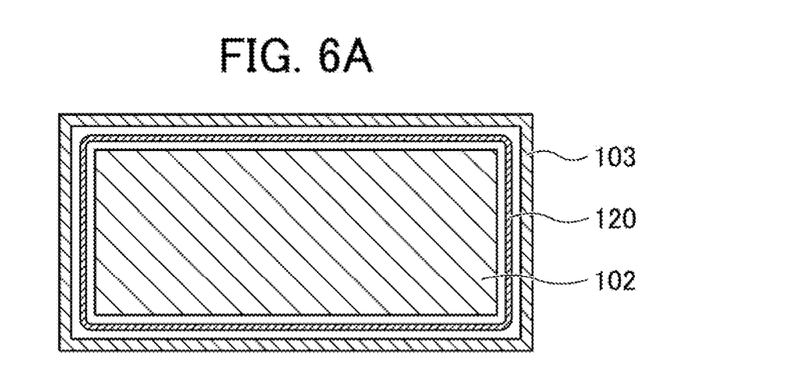
FIGS. 6A and 6B are simplified side views of embodiments of the solid-state battery constituting a solid-state battery module.
Figure 6B:
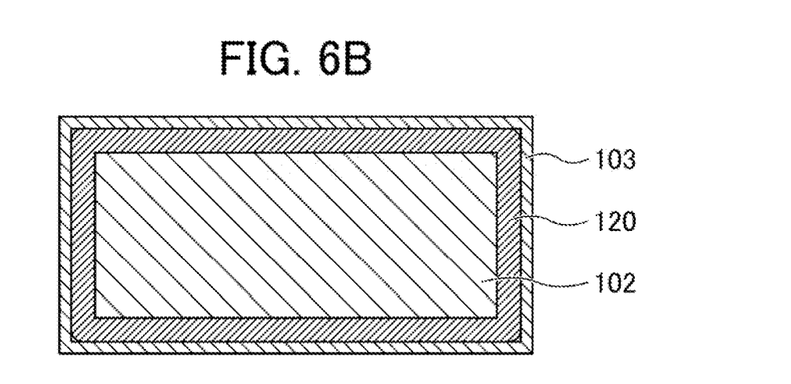

As shown in FIG. 6A, in the solid-state battery according to an embodiment of the present invention, the expansion material 120 is preferably disposed between the battery cell 102 and the battery case 103, and as shown in FIG. 6B, the expansion material 120 is preferably expanded, and the battery cell 102 is brought into close contact with the battery case 103, to thereby apply surface pressure to the solid-state battery.

The expansion material is not particularly limited, but an expansion material which expands in volume by water absorption or a chemical reaction such as polymerization, or changes in volume by heat is preferred.

Assembly of batteries is usually carried out in a dry environment, but the incorporation of moisture on the order of ppm is unavoidable.

In the case where the expansion material that expands by water absorption is used, the expansion material absorbs the incorporated moisture and expands in volume, to thereby bring the battery case into close contact with the battery cell, and apply a surface pressure to the solid-state battery, and additionally the moisture inside the solid-state battery can be brought close to 0% at the same time.

In particular, when a sulfide-based electrolyte is used, hydrogen sulfide may be generated due to the presence of moisture, and may deteriorate the battery cell.

Use of the expansion material which expands by water absorption can suppress the generation of hydrogen sulfide even when the sulfide-based electrolyte is used, and as a result, the deterioration of the solid-state battery can be suppressed.

Further, even when the sealing portion of the solid-state battery is deteriorated and the atmosphere enters, the expansion material allows for the suppression of the deterioration of the battery since the expansion material absorbs the moisture in the atmosphere flowing into the inside of the battery.

The material which expands in volume by water absorption is not particularly limited, and examples thereof include zeolites, silica gels, and the like.

In addition, in the case where a material which expands in volume by a chemical reaction such as polymerization is used as an expansion material, a polymerization initiator may be added in a polymerization composition, such that timing of the volume expansion can be adjusted and then the polymerization composition can be solidified.

Therefore, the volume expansion can be achieved at a timing when the application of surface pressure is desired.

The material which expands in volume by a chemical reaction such as polymerization is not particularly limited, and examples thereof include urethane foam and the like.

Further, in the case where those which change in volume by heat are used as an expansion material, surface pressure can be ensured by utilizing the difference in thermal expansion coefficient.

For example, the expansion material may be cooled to or below ambient temperature to cause contraction in volume of the expansion material, put into the battery case in its contraction state, and thereafter expanded by warming the expansion material to ambient temperature. This allows for close contact of the battery case with the battery cell, and for the application of surface pressure to the solid-state battery.

The material which changes in volume by heat is not particularly limited, and examples thereof include polypropylene, polyethylene terephthalate resins, and the like.

<Module Component>

The module component constituting the solid-state battery module of the present invention is not particularly limited, and it may be any component required for a normal battery module.

For example, the module component is exemplified by a bus bar, a thermistor, a harness, a voltage detection line, a battery case fixing member, a cell voltage and temperature monitoring unit and the like, and in the present invention, the module component may be at least one selected from the group consisting of those listed above.

[Arrangement of Module Component]

The module component constituting the solid-state battery module of the present invention is arranged in the recess formed in the battery case of the battery constituting the module.

In the present invention, it is sufficient that at least a part of the various module components is arranged.

In the present invention, the module component is arranged in the recess formed in the region which corresponds to the residual space in the conventional battery. This makes it possible to reduce the volume of the entire battery module, and consequently to improve the energy density of the battery module.

Further, since there is no residual space in the battery case, the displacement, peeling or the like of the battery cell due to vibration or the like can be suppressed.

Referring to the battery module 100, which is an embodiment of the present invention, the outer shape of the battery case 103 conforms to the outer shape of the battery cell 102, and the recess is formed in the battery case 103 between the convex portion for storing the positive electrode tab 104 and the convex portion for storing the negative electrode tab 109, as shown in FIG. 2B.

In other words, the upper face of the battery cell 102 has a shape in which the recess is present in the region corresponding to the residual space in the conventional battery.

In FIG. 2B, which is a cross-sectional view of the solid-state battery module according to an embodiment of the present invention, the thermistor 108, which is a module component, is disposed in the recess formed between the convex portion for storing the positive electrode tab 104 and the convex portion for storing the negative electrode tab 109.

Further, the two terminals 105 are arranged, with one of the terminals 105 being electrically connected to the convex portion for storing the positive electrode tab 104 and the other to the convex portion for storing the negative electrode tab 109. Other module components, i.e., the bus bar 106, and the voltage detection line 107 are arranged so as to line up with the terminals 105.

<Applications of Solid-State Battery Modules>

The solid-state battery module of the present invention can be used in various apparatuses.

The solid-state battery module of the present invention has a small volume, and high energy density, and is unlikely to cause terminal displacement or the like due to vibration.

Therefore, the solid-state battery module of the present invention can be suitably used, for example, as a power source for electric vehicles and hybrid vehicles, and the like, as well as in portable devices.

EXPLANATION OF REFERENCE NUMERALS

100, 200 battery module
101, 201 battery
102, 202 battery cell
103, 203 battery case
104, 204 positive electrode tab
105, 205 terminal
106, 206 bus bar
107, 207 voltage detection line
108, 208 thermistor
109, 209 negative electrode tab
110, 210 module component
111 gap 112 pressing portion
113, 213 top cover
114, 214 binding bar
115, 215 lower plate
116 fin
120 expansion material
216 separator
217 end plate
218 thermally conductive material

The invention claimed is:

1. A solid-state battery module comprising a plurality of solid-state batteries and a module component, wherein
the plurality of solid-state batteries are arranged so as to be substantially parallel to a predetermined direction,
each of the plurality of solid-state batteries comprises a solid-state battery cell, and a battery case for accommodating the solid-state battery cell,
wherein the solid-state battery cell comprises a positive electrode, a negative electrode, a solid electrolyte present between the positive electrode and the negative electrode, a positive electrode tab connected to the positive electrode, and a negative electrode tab connected to the negative electrode,
wherein an outer dimension of the battery case is identical to an outer dimension of the solid-state battery cell, and
wherein the battery case comprises a recess,
the module component is disposed in the recess,
the battery case comprises at least two convex portions,
the recess is formed between the convex portions,
the positive electrode tab and the negative electrode tab are stored separately in different convex portions of the at least two convex portions, and
the module component is at least one selected from the group consisting of a bus bar, a thermistor, a harness, a voltage detection line, and a cell voltage and temperature monitoring unit,
wherein the battery case is made of metal,
a face constituting the battery case which is substantially parallel to the predetermined direction comprise a pressing portion for applying a surface pressure to the solid-state battery cell, and
a gap is defined between two adjacent solid-state batteries of the plurality of solid-state batteries by the pressing portion.

2. The solid-state battery module according to claim 1, wherein the convex portion for storing the positive electrode tab and the convex portion for storing the negative electrode tab are provided on different faces in the battery case.

3. The solid-state battery module according to claim 1, wherein the pressing portion is provided on a set of opposing faces of the battery case.

4. The solid-state battery module according to claim 2, wherein at least one selected from the group consisting of air, water, a heat transfer material, a heater and the like, and an electrically insulating material or an electrically conductive material, a cushioning material and a battery case fixing member is present in the gap.

5. The solid-state battery module according to claim 1, wherein a heat sink is disposed in the pressing portion.

6. The solid-state battery module according to claim 5, wherein the heat sink is a fin or an uneven structure.

7. The solid-state battery module according to claim 1, wherein the solid-state battery comprises an expansion material between the solid-state battery cell and the battery case, and
the expansion material expands in volume by water absorption or a chemical reaction, or changes in volume by heat.

8. An apparatus comprising the solid-state battery module according to claim 1.

* * * * *